Figure 1:
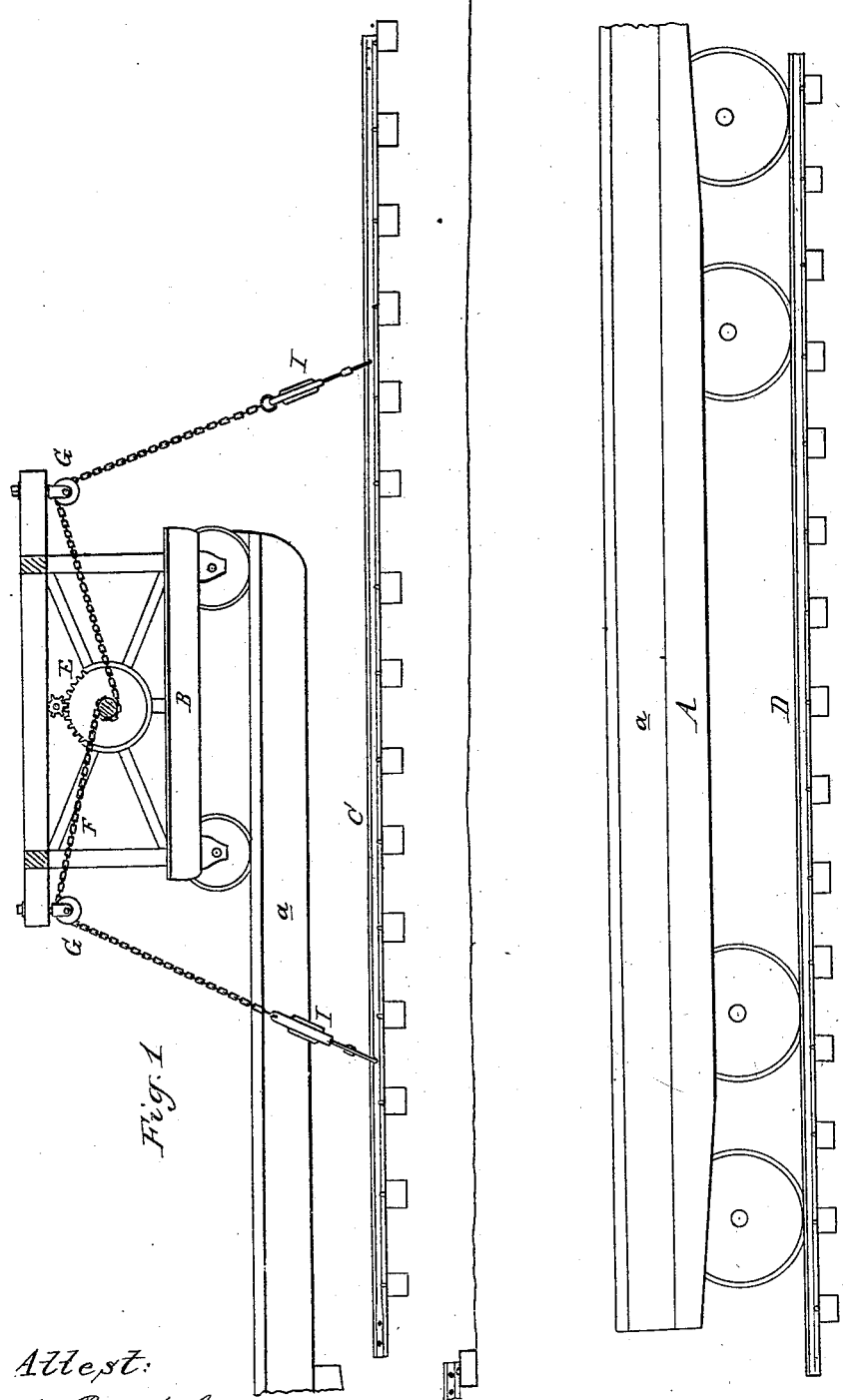

(No Model.)

J. TURNER.
RAILWAY TRACK LAYER.

No. 275,096. Patented Apr. 3, 1883.

Attest:
A. Bartpel

Inventor:
John Turner
by his Atty (No Model.) 2 Sheets—Sheet 2.
J. TURNER.
RAILWAY TRACK LAYER.
No. 275,096. Patented Apr. 3, 1883.
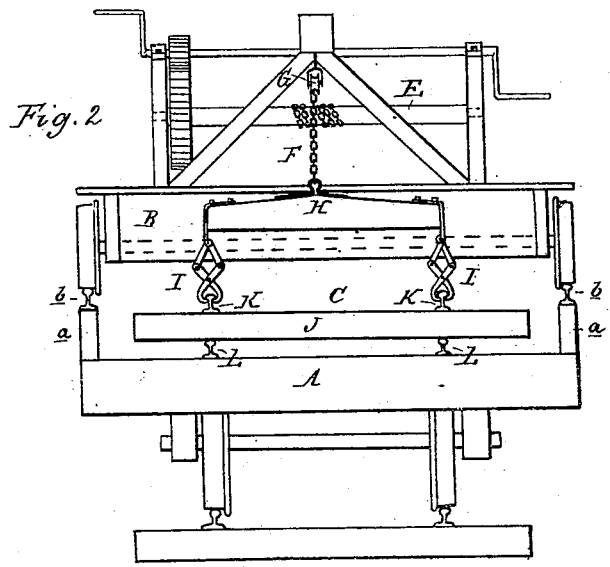
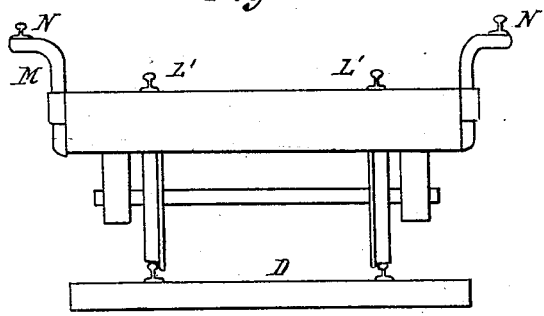
Attest:
A. Barthel
Inventor:
John Turner
by his Att'y

United States Patent Office.

JOHN TURNER, OF GROSSE ISLE, MICHIGAN.

RAILWAY-TRACK LAYER.

SPECIFICATION forming part of Letters Patent No. 275,096, dated April 3, 1883.

Application filed October 25, 1882. (No model.)

*To all whom it may concern:*

Be it known that I, JOHN TURNER, of Grosse Isle, (Mongaugon,) in the county of Wayne and State of Michigan, have invented new and useful Improvements in Railway-Track Layers; and I do hereby declare that the following is a full, clear, and exact description thereof, reference being had to the accompanying drawings, which form a part of this specification.

The nature of this invention relates to certain new and useful improvements in the construction and operation of devices for laying railway-tracks, by means of which the work can be easily done, and with rapidity and certainty.

The invention consists in the peculiar construction and operation of the various parts and their combination, as more fully hereinafter described.

Figure 1 shows a side elevation of the forward car in a construction-train, showing the method of laying a section of a track completed. Fig. 2 is an end view of a track-laying car, together with the auxiliary truck or lowry, provided with a hoisting apparatus. Fig. 3 is an end view of a construction-car which is employed in the operation with the car shown in Fig. 1.

In the accompanying drawings, which form a part of this specification, A represents a platform-car the floor of which is of sufficient width to allow the hereinafter-described mechanism to be used and operation to be performed. Upon each side of this car are rigidly secured the supports $a$, upon each of which is secured the rail $b$, thereby forming a track upon which the auxiliary hoisting truck or lowry B traverses. The supports $a$ of this truck project beyond the front end of this car, as shown in Fig. 1, a sufficient distance to allow the auxiliary truck to be run out thereon, as shown, and there being a free space between such supports forward of the end of the floor of the car to allow a completed section, C, of track to be lowered between such supports to the road-bed below in line with the completed track D upon which the car A is standing. This auxiliary truck B is provided with a windlass, E. The drum of this windlass is adapted to wind or unwind the chains F, their ends being so secured to the drum or shaft that although the chains project therefrom in opposite directions they both wind or unwind simultaneously with the motion of the shaft. The chains lead (the one forward and the other rearward) over the pulleys G, and their free ends are provided with a fork, H, to the ends of which are pivotally secured the lazy-tongs I or other suitable grapnels.

As will be hereinafter explained, a section of track consisting of the ties J and rails K will be built upon the floor of the car A, upon the two rails L, which form a track coincident in width with the track of the road and the entire length of the floor of such car. This section of track being completed, the auxiliary truck is run upon its track centrally over such section, which is picked up by the grapnels and windlass when said truck is run forward to the end of the overhanging track, and lowered to place on the bed-track below in perfect line with the completed track upon which the car stands. The other necessary cars in a construction-train, consisting of flat cars, a portion of which will carry the rails and another portion the ties, are also provided with rails L', forming thereon a track coincident with the track L upon the track-laying car A for the purpose of allowing an auxiliary platform-truck to be run over them for the purpose of bringing ties to be employed in laying the section of track on the car A. In order the more readily to handle the rails and bring them forward to complete such section of track, the car or cars carrying said rails should be next in rear of the car A, and in order to allow the hoisting-truck B to be run back and grapple and bring forward such rails I provide overhanging brackets M, which are stepped into the stake-pockets with which the platform-cars are usually provided, the overhanging end of said brackets carrying the rails N, by means of which a track is provided of the same width as and coincident with the track on the car A, upon which the auxiliary hoisting-car B travels.

By means of this track-laying apparatus I am able to lay track with great facility and with a less number of men than is ordinarily employed.

What I claim as my invention is—

1. A track-laying car provided with a longitudinal track upon its floor and an elevated longitudinal track of broader gage, which latter projects beyond the end of said car, in combination with an auxiliary car running upon said elevated track and provided with a hoisting apparatus, substantially as and for the purposes described.

2. In combination with a platform construction-car of the ordinary construction, and provided with side pockets and a longitudinal track, the overhanging brackets adapted to support a track coincident with the elevated track upon the track-laying car, substantially as specified.

JOHN TURNER.

Witnesses:
H. S. SPRAGUE,
CHARLES J. HUNT.